US012682237B2

(12) United States Patent
Taghia et al.

(10) Patent No.: US 12,682,237 B2
(45) Date of Patent: Jul. 14, 2026

(54) COLLABORATIVE MACHINE LEARNING WHOSE RESULT IS STORED IN A SHARED MEMORY CONTROLLED BY A CENTRAL DEVICE

(71) Applicant: Telefonaktiebolaget LM Ericsson (publ), Stockholm (SE)

(72) Inventors: Jalil Taghia, Stockholm (SE); Wenfeng Hu, Täby (SE); Konstantinos Vandikas, Solna (SE); Selim Ickin, Stocksund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 537 days.

(21) Appl. No.: 18/274,606

(22) PCT Filed: Feb. 26, 2021

(86) PCT No.: PCT/SE2021/050164
§ 371 (c)(1),
(2) Date: Jul. 27, 2023

(87) PCT Pub. No.: WO2022/182273
PCT Pub. Date: Sep. 1, 2022

(65) Prior Publication Data
US 2024/0078427 A1      Mar. 7, 2024

(51) Int. Cl.
*G06N 3/08* (2023.01)
*G06N 5/04* (2023.01)

(52) U.S. Cl.
CPC ................. *G06N 3/08* (2013.01); *G06N 5/04* (2013.01)

(58) Field of Classification Search
CPC ........ G06N 3/08; G06N 3/006; G06N 3/0442; G06N 3/045; G06N 3/09; G06N 3/098;
(Continued)

(56) References Cited

U.S. PATENT DOCUMENTS

| | | | |
|---|---|---|---|
| 2018/0240011 A1 | 8/2018 | Tan et al. | |
| 2019/0205737 A1 | 7/2019 | Bleiweiss et al. | |

(Continued)

FOREIGN PATENT DOCUMENTS

WO      2020246920 A1    12/2020

OTHER PUBLICATIONS

International Search Report and Written Opinion of the International Searching Authority, PCT/SE2021/050164, mailed Oct. 5, 2021, 12 pages.
(Continued)

*Primary Examiner* — Nelson S. Giddins
(74) *Attorney, Agent, or Firm* — Sage Patent Group

(57) ABSTRACT
According to a second aspect, it is provided a method for enabling collaborative machine learning. The method is performed by an agent device. The method includes the steps of: obtaining local input data; generating read interface parameters based on the local input data using a controller neural net; generating write interface parameters; transmitting a central reading request to the central device; receiving a central reading from the central device; updating the controller neural net of the agent device based on the central reading; and providing a predictor output of local input data based on the controller neural net and a second model of the agent device, the second model having as an input an output of the controller neural net, wherein the predictor output is obtained from the second model.

16 Claims, 6 Drawing Sheets

(58) Field of Classification Search

CPC .............................. G06N 3/0985; G06N 5/04; G06F 2212/1044; G06F 12/0207; G06F 15/167

See application file for complete search history.

(56) References Cited

U.S. PATENT DOCUMENTS

| | | | |
|---|---|---|---|
| 2019/0227980 | A1 | 7/2019 | McMahan et al. |
| 2019/0294999 | A1* | 9/2019 | Guttmann .............. G06N 5/025 |
| 2019/0391811 | A1* | 12/2019 | Garegrat .............. G06F 9/3455 |
| 2020/0358599 | A1 | 11/2020 | Baracaldo Angel et al. |
| 2026/0046317 | A1* | 2/2026 | Crabtree ................. H04L 63/20 |

OTHER PUBLICATIONS

Park, Jihong et al., "Communication-Efficient and Distributed Learning Over Wireless Networks: Principles and Applications," Proceedings of the IEEE, vol. 109, No. 5, May 2021, 24 pages.

Mcmahan, H. Brendan et al., "Federated Learning of Deep Networks using Model Averaging," arXiv:1602.05629v1, Feb. 17, 2016, 11 pages.

Graves, Alex et al., "Hybrid computing using a neural network with dynamic external memory," Nature, 538, 2016, 21 pages.

Park, Taewon et al., "Distributed Memory based Self-Supervised Differentiable Neural Computer," arXiv:2007.10637v1, Jul. 21, 2020, 10 pages.

Mcmahan, H. Brendan et al., "Communication-Efficient Learning of Deep Networks from Decentralized Data," Proceedings of the 20th Annual International Conference on Artificial Intelligence and Statistics (AISTATS) 2017, Fort Lauderdale, Florida, USA, 10 pages.

Shokri, Reza et al, "Privacy-Preserving Deep Learning," 2015 53rd Annual Allerton Conference on Communication, Control, and Computing (Allerton), 2015, 12 pages.

Extended European Search Report for European Patent Application No. 21928267.0, dated Nov. 7, 2024, 14 pages.

Bercea, Cosmin et al., "SHAMANN: Shared Memory Augmented Neural Networks," Advances in Databases and Information Systems; Lecture Notes in Computer Science; Springer International Publishing, 2019, 12 pages.

Arivazhagan, Manoj Ghuhan et al., "Federated Learning with Personalization Layers," arXiv:1912.00818v1 [cs.LG] Dec. 2, 2019, 13 pages.

Lim, Eun-Ji et al., Accelerating Training of DNN in Distributed Machine Learning System with Shared Memory, 2017 International Conference on Information and Communication Technology Convergence (ICTC), IEEE, Oct. 18, 2017, 4 pages.

Khadka, Shauharda et al, "Memory-Based Multiagent One-Shot Learning," 2019 International Symposium on Multi-Robot and Multi-Agent Systems (MRS), Rutgers University, New Brunswick, New Jersey, USA, Aug. 22-23, 2019, 3 pages.

Chen, Chen et al., "Multilingual Dialogue Generation with Shared-Private Memory," Natural Language Processing and Chinese Computer; Lecture Notes in Computer Science, Springer International Publishing, Sep. 30, 2019, 13 pages.

* cited by examiner

1

$M_{t-1}$

2a $\{r_{t-1}^{A,i}\}_{i=1:R}$ $x_t^A$

10a
Controller neural net $v_t^A$ $\theta_t^{A,r}$ $\theta_t^{A,w}$

23a
Read Head

11a
predictive model $y_t^A$ $\{r_t^{A,i}\}_{i=1:R}$

20
Aggregator $\bar{\theta}_t^w$

21
Write Head

22

$M_t$

3

$x_t^B$

10b
Controller neural net $\theta_t^{B,w}$ $\theta_t^{B,r}$ $v_t^B$ $\{r_t^{B,i}\}_{i=1:R}$

23b
Read Head

11b
predictive model $y_t^B$ $\{r_{t-1}^{B,i}\}_{i=1:R}$

2b

<table>
<tr><td colspan="3" align="center">3</td></tr>
<tr>
<td align="center">170<br>Request<br>receiver</td>
<td align="center">172<br>Aggregator</td>
<td align="center">173<br>Write head<br>parameter<br>provider</td>
</tr>
<tr>
<td align="center">174<br>Memory matrix<br>updater</td>
<td align="center">175<br>Read head<br>parameter<br>provider</td>
<td align="center">176<br>Reader</td>
</tr>
<tr>
<td align="center">177<br>Readings<br>transmitter</td>
<td align="center">178<br>Gradient<br>receiver</td>
<td align="center">179<br>Central read<br>gradient<br>computer</td>
</tr>
<tr>
<td align="center">180<br>Central write<br>gradient<br>computer</td>
<td align="center">181<br>Central<br>gradient<br>transmitter</td>
<td></td>
</tr>
</table>

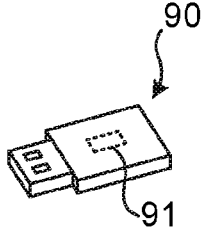

COLLABORATIVE MACHINE LEARNING WHOSE RESULT IS STORED IN A SHARED MEMORY CONTROLLED BY A CENTRAL DEVICE

CROSS REFERENCE TO RELATED APPLICATIONS

This application is a 35 U.S.C. § 371 national stage application of PCT International Application No. PCT/SE2021/050164 filed on Feb. 26, 2021, the disclosure and content of which is incorporated by reference herein in its entirety.

TECHNICAL FIELD

The present disclosure relates to the field of machine learning and in particular to collaborative machine learning, a result of which is stored in a shared memory controlled by a central device.

BACKGROUND

Collaborative learning for machine learning models can improve performance greatly by using learning data from multiple different sources.

Differentiable neural computers (DNCs) are memory augmented neural nets that are capable of solving a wide range of algorithmic and question answering tasks. At its core, a DNC contains a neural net and an external memory. The external memory can be seen as the random-access memory in a conventional computer. A DNC uses its neural net in order to read from and write to the memory matrix. The memory matrix is learned from data and is used to manipulate and infer complex data structures.

Since a DNC has an external memory that can, in theory, be arbitrarily large, compared to the recurrent neural nets (such as LSTM, long short-term memory), it can store far more information. This makes DNCs particularly attractive for self-supervised learning problems such as meta learning, question answering tasks, and devising self-debugging algorithms. The single most attractive feature of DNCs is the fact that the external memory can be large. The standard design of the DNC contains a single memory which does not naturally allow for distributed learning.

Park, Taewon et al. "Distributed Memory based Self-Supervised Differentiable Neural Computer." ArXiv abs/2007.10637 (2020) propose a distributed memory architecture of the DNC, referred to as DMSDNC. Unlike the DNC that has a single memory unit, DMSDNC contains multiple memories that are shared across nodes in a distributed environment.

SUMMARY

One object is to provide a way to use collaborative machine learning for architectures with a shared memory controlled by a central device.

According to a first aspect, it is provided a system for enabling collaborative machine learning, a result of which is stored in a shared memory controlled by a central device and enabling performing inference by a plurality of agent devices comprising respective machine learning models configured for inference based on the shared memory, the system comprising the plurality of agent devices and the central device. Each one of the agent devices comprises: a processor; and a memory storing instructions that, when executed by the processor, cause the agent device to: obtain local input data; generate read interface parameters based on the local input data using a controller neural net being a first model; generate write interface parameters based on the local input data using the controller neural net; transmit a central reading request to the central device, the central reading request comprising the read interface parameters and the write interface parameters, the central reading request requesting the central device to update the memory matrix based on the write interface parameters and to read the memory matrix based on the read interface parameters; receive a central reading from the central device; update the controller neural net of the agent device based on the central reading; and provide a predictor output of local input data based on the controller neural net and a second model of the agent device, the second model having as an input an output of the controller neural net, wherein the predictor output is obtained from the second model. The central device comprises: a processor; and a memory storing instructions that, when executed by the processor, cause the central device to: receive a plurality of the central reading requests from the agent devices; aggregate the write interface parameters of the plurality of central reading requests; provide parameters for a write head based on the aggregated write interface parameters; update a memory matrix based on the write head; provide, for each agent device, parameters for a read head based on the respective read interface parameters; read, for each agent device, a central data reading being a selection of data from the memory matrix based on the respective read head; and transmit the central data readings, respectively, to each one of the agent devices.

According to a second aspect, it is provided a method for enabling collaborative machine learning, a result of which is stored in a shared memory controlled by a central device and enabling performing inference by a plurality of agent devices comprising respective machine learning models configured for inference based on the shared memory. The method is performed by one of the agent devices. The method comprises the steps of: obtaining local input data; generating read interface parameters based on the local input data using a controller neural net being a first model; generating write interface parameters based on the local input data using the controller neural net; transmitting a central reading request to the central device, the central reading request comprising the read interface parameters and the write interface parameters, the central reading request requesting the central device to update a memory matrix based on the write interface parameters and to read the memory matrix based on the read interface parameters; receiving a central reading from the central device; updating the controller neural net of the agent device based on the central reading; and providing a predictor output of local input data based on the controller neural net and a second model of the agent device, the second model having as an input an output of the controller neural net, wherein the predictor output is obtained from the second model.

The method may further comprise the step of: computing a loss by comparing an estimation of the predictor output with an actual outcome; computing a set of controller gradients of the loss with respect to the read interface parameters and the write interface parameters, respectively; computing a set of prediction gradients of the loss with respect to the predictor output; transmitting the set of controller gradients to the central device; receiving from the central device a set of central read gradients of the read interface parameters with respect to a read head in the central device for the agent device; receiving from the central device a set of central write gradients of the write interface parameters with respect to a read head in the central device for the agent device; updating neural net parameters for the controller neural net based on the received central read gradients and the received central write gradients; and updating parameters for the second model based on the received central read gradients and the received central write gradients.

The method may further comprise the step of: repeating the method until a stopping criterion is true.

The stopping criterion may be true when a variation metric of average loss for the agent device and other agent devices is less than a threshold.

The stopping criterion may be true after a threshold number of iterations of the method.

According to a third aspect, it is provided an agent device for enabling collaborative machine learning, a result of which is stored in a shared memory controlled by a central device and enabling performing inference by a plurality of agent devices comprising respective machine learning models configured for inference based on the shared memory. The agent device comprises: a processor; and a memory storing instructions that, when executed by the processor, cause the agent device to: obtain local input data; generate read interface parameters based on the local input data using a controller neural net being a first model; generate write interface parameters based on the local input data using the controller neural net; transmit a central reading request to the central device, the central reading request comprising the read interface parameters and the write interface parameters, the central reading request requesting the central device to update a memory matrix based on the write interface parameters and to read the memory matrix based on the read interface parameters; receive a central reading from the central device; update the controller neural net of the agent device based on the central reading; and provide a predictor output of local input data based on the controller neural net and a second model of the agent device, the second model having as an input an output of the controller neural net, wherein the predictor output is obtained from the second model.

The agent device may further comprise instructions that, when executed by the processor, cause the agent device to: compute a loss by comparing an estimation of the predictor output with an actual outcome; compute a set of controller gradients of the loss with respect to the read interface parameters and the write interface parameters, respectively; compute a set of prediction gradients of the loss with respect to the predictor output; transmit the set of controller gradients to the central device; receive from the central device a set of central read gradients of the read interface parameters with respect to a read head in the central device for the agent device; receive from the central device a set of central write gradients of the write interface parameters with respect to a read head in the central device for the agent device; update neural net parameters for the controller neural net based on the received central read gradients and the received central write gradients; and update parameters for the second model based on the received central read gradients and the received central write gradients.

The agent device may further comprise instructions that, when executed by the processor, cause the agent device to: repeat said instructions until a stopping criterion is true.

The stopping criterion may be true when a variation metric of average loss for the agent device and other agent devices is less than a threshold.

The stopping criterion may be true after a threshold number of iterations.

According to a fourth aspect, it is provided a computer program for enabling collaborative machine learning, a result of which is stored in a shared memory controlled by a central device and enabling performing inference by a plurality of agent devices comprising respective machine learning models configured for inference based on the shared memory. The computer program comprises computer program code which, when executed on one of the agent devices causes the agent device to: obtain local input data; generate read interface parameters based on the local input data using a controller neural net being a first model; generate write interface parameters based on the local input data using the controller neural net; transmit a central reading request to the central device, the central reading request comprising the read interface parameters and the write interface parameters, the central reading request requesting the central device to update a memory matrix based on the write interface parameters and to read the memory matrix based on the read interface parameters; receive a central reading from the central device; update the controller neural net of the agent device based on the central reading; and provide a predictor output of local input data based on the controller neural net and a second model of the agent device, the second model having as an input an output of the controller neural net, wherein the predictor output is obtained from the second model.

According to a fifth aspect, it is provided a computer program product comprising a computer program according to the fourth aspect and a computer readable means on which the computer program is stored.

According to a sixth aspect, it is provided a method for enabling collaborative machine learning, a result of which is stored in a shared memory controlled by a central device and enabling performing inference by a plurality of agent devices comprising respective machine learning models configured for inference based on the shared memory. The method is performed by the central device. The method comprises the steps of: receiving a plurality of central reading requests from respective agent devices, the central reading request comprising read interface parameters and write interface parameters; aggregating the write interface parameters of the plurality of central reading requests; providing parameters for a write head based on the aggregated write interface parameters; updating a memory matrix based on the write head; providing, for each agent device, parameters for a read head based on the respective read interface parameters; reading, for each agent device, a central data reading being a selection of data from the memory matrix based on the respective read head; and transmitting the central data readings, respectively, to each one of the agent devices.

The step of providing parameters for a write head may comprise providing parameters for the write head based on the aggregated write interface parameters and a current state of the memory matrix.

The step of providing parameters for a read head may comprise providing parameters for the read head based on the respective read interface parameters and a current state of the memory matrix.

The step of aggregating may comprise aggregating the write interface parameters of the plurality of central reading requests by calculating an average of the write interface parameters.

The method may further comprise the steps of: receiving respective sets of controller gradients from each one of the plurality of agent devices; computing, for each one of the plurality of agent devices, a set of central read gradients of the read interface parameters with respect to parameters for the read head for the agent device; computing, for each one of the plurality of agent devices, a set of central write gradients of the write interface parameters for the agent device with respect to parameters for the write head; and transmitting respective sets of central read gradients and central write gradients to each one of the plurality of agent devices.

According to a seventh aspect, it is provided a central device for enabling collaborative machine learning, a result of which is stored in a shared memory controlled by a central device and enabling performing inference by a plurality of agent devices comprising respective machine learning models configured for inference based on the shared memory. The central device comprises: a processor; and a memory storing instructions that, when executed by the processor, cause the central device to: receive a plurality of central reading requests from respective agent devices, the central reading request comprising read interface parameters and write interface parameters; aggregate the write interface parameters of the plurality of central reading requests; provide parameters for a write head based on the aggregated write interface parameters; update a memory matrix based on the write head; provide, for each agent device, parameters for a read head based on the respective read interface parameters; read, for each agent device, a central data reading being a selection of data from the memory matrix based on the respective read head; and transmit the central data readings, respectively, to each one of the agent devices.

The instructions to provide parameters for a write head may comprise instructions that, when executed by the processor, cause the central device to provide parameters for the write head based on the aggregated write interface parameters and a current state of the memory matrix.

The instructions to provide parameters for a read head may comprise instructions that, when executed by the processor, cause the central device to provide parameters for the read head based on the respective read interface parameters and a current state of the memory matrix.

The instructions to aggregate may comprise instructions that, when executed by the processor, cause the central device to aggregate the write interface parameters of the plurality of central reading requests by calculating an average of the write interface parameters.

The central device may further comprise instructions that, when executed by the processor, cause the central device to: receive respective sets of controller gradients from each one of the plurality of agent devices; compute, for each one of the plurality of agent devices, a set of central read gradients of the read interface parameters with respect to parameters for the read head for the agent device; compute, for each one of the plurality of agent devices, a set of central write gradients of the write interface parameters for the agent device with respect to parameters for the write head; and transmit respective sets of central read gradients and central write gradients to each one of the plurality of agent devices.

According to an eighth aspect, it is provided a computer program for enabling collaborative machine learning, a result of which is stored in a shared memory controlled by a central device and enabling performing inference by a plurality of agent devices comprising respective machine learning models configured for inference based on the shared memory. The computer program comprises computer program code which, when executed on the central device causes the central device to: receive a plurality of central reading requests from respective agent devices, the central reading request comprising read interface parameters and write interface parameters; aggregate the write interface parameters of the plurality of central reading requests; provide parameters for a write head based on the aggregated write interface parameters; update a memory matrix based on the write head; provide, for each agent device, parameters for a read head based on the respective read interface parameters; read, for each agent device, a central data reading being a selection of data from the memory matrix based on the respective read head; and transmit the central data readings, respectively, to each one of the agent devices.

According to a ninth aspect, it is provided a computer program product comprising a computer program according to the eighth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 7 is a schematic diagram showing functional modules of the central device of FIG. 1 according to one embodiment; and FIG. 8 shows one example of a computer program product comprising computer readable means.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figures 1, 2:
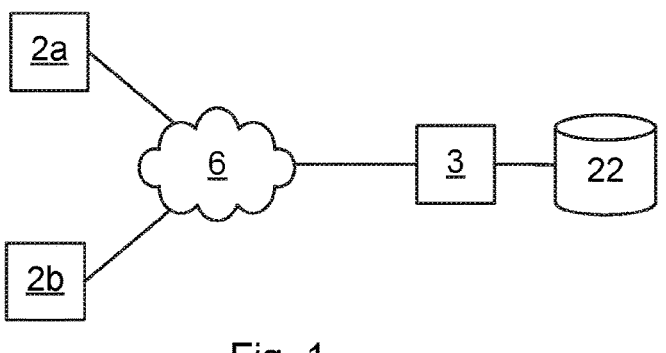
FIG. 1 is a schematic diagram illustrating an environment in which embodiments presented herein can be applied.
FIG. 2 is a schematic diagram illustrating functional components and interaction between the central component and agent devices of FIG. 1.

FIG. 1 is a schematic diagram illustrating an environment in which embodiments presented herein can be applied.

There are here a first agent device 2a and a second agent device 2b. It is to be noted that more agent devices 2a-b could be provided. Both agent devices 2a-b are machine learning devices capable of using external memory, e.g. conforming with a DNC structure.

Each agent device 2a-b is connected to a network 6, which can be an internet protocol (IP) based network. The network can e.g. comprise any one or more of a local wireless network, a cellular network, a wired local area network, a wide area network (such as the Internet), etc.

A central device 3 is also connected to the network 6. The central device 3 is logically central, in that it is connection with each one of the agent devices 2a-b. The central device 3 controls a shared memory 22 which is used for collaborative learning by the agent devices 2a-b. The agent devices 2a-b perform inference at least partly based on data in the shared memory 22. As described in more detail below with reference to FIG. 2, the manner in which the agent devices 2a-b read and write to the shared memory is according to a specific structure to enable selective collaborative learning using the shared memory.

One might envision that the central shared memory 22 could be used in straight off in combination with local external memories that might be used in a known DNC structure, where the local external memories are aggregated and distributed in the central memory 22, to arrive at collaborative learning. The agent devices 2a-b could share the contents of their local memories with central device 3. The central device 3 would take the average of the memories and share the averaged memory with the agent devices 2a-b. However, a problem with this approach is that the size of memory has to be small enough, otherwise the communication cost becomes prohibitively large. On the other hand, having a small memory is not desirable since it greatly limits its effectiveness. A motivation behind design of the DNC, as an example of memory augmented neural nets, is to allow for the external memory to be of arbitrary large size, which is important for solving memory intensive cognitive tasks.

According to embodiments presented herein, each agent device 2a-b comprises both a first model being a controller neural net, which can be used for selective collaborative learning with the central device 7, as well as second model being a predictive model which is designed freely and is not used for collaborative learning, as shown in FIG. 2.

The agent devices 2a-b only communicate the parameters of the controller neural net with the central device 3, and they do not share any parameters of their predictive model. This reduces the amount of data that needs to be communicated for the collaborative learning, while allowing great freedom for the design of the predictive model. In this way, the predictive model can be a neural net of a substantial size, or any other differentiable predictive model. On the other hand, the controller neural net can be of small size, enabling feasible communication of parameters of the neural net. Unlike the standard neural nets where the neural weights play the role of memory, in this design, the memory is external in the shared memory. Hence, there is no need for the controller neural net to be large in itself.

Still, this architecture allows the central memory 22 to be large. The central node 3 does not need to communicate the entire shared memory 22 with the agent devices; only readings from the shared memory 22 being vectors of smaller size are sent to the agent devices. Since the shared memory 22 can be quite large, it is capable of storing long-term representations of data (meta data) that can help improve the accuracy in such cases.

FIG. 2 is a schematic diagram illustrating functional components and interaction between the central component and agent devices of FIG. 1.

Each one of the agent devices 2a-b comprises a respective controller neural net 10a-b (also referred to as the first model) and a predictive model 11a-b (also referred to as the second model).

The central device comprises (or has access to) a shared memory 22. An aggregator 20 collects and aggregates data from the agent devices 2a-b and a write head 21 is used to write to the shared memory 22. Respective read heads 23a-b are used to read data from the shared memory 22, tailored to the respective agent device 2a-b. Even only two agent devices 2a-b are shown here, the same structure applies if more than two agent devices are provided.

The parameters presented in FIG. 2 are as follows:

$M_{t-1}$ previously learned memory matrix $M_t$ current memory matrix $$\{r_{t-1}^{A,i}\}_{i=1:R}$$

previous readings from memory for the first agent device 2a $$\{r_{t-1}^{B,i}\}_{i=1:R}$$

previous readings from memory for the second agent device 2b $$\{r_t^{A,i}\}_{i=1:R}$$

current readings from memory for the first agent device 2a $$\{r_t^{B,i}\}_{i=1:R}$$

current readings from memory for the second agent device 2b $$x_t^A$$

input local data for the first agent device 2a $$x_t^B$$

input local data for the second agent device 2b $$v_t^A$$

controller output for the first agent device 2a

$$v_t^B$$

controller output for the second agent device 2b

$$\Theta_t^{A,r}$$

read interface parameters for the first agent device 2a

$$\Theta_t^{B,r}$$

read interface parameters for the second agent device 2b

$$\Theta_t^{A,w}.$$

write interface parameters for the first agent device 2a

$$\Theta_t^{B,w}$$

write interface parameters for the second agent device 2b

$$\overline{\Theta}_t^{w}$$

aggregated write interface parameters $$y_t^A$$

output response for the first agent device 2a

$$y_t^B$$

output response for the second agent device 2b

It is to be noted that any or all of the parameters can be compressed to reduce network footprint on the communication channel prior to transmitting the data. Some examples of such compression include quantization, lossless compression, lossy compression in the case of secret sharing, auto encoder, employing generative models (GAN), etc. The receiver would then need to apply corresponding decompression prior to applying the parameter(s).

The memory matrix M is of size N by W. It is a row matrix implying that each row specifies a memory location of length W. The mentioned structure can be transposed between rows and columns and still support embodiments presented herein.

The controller neural net output v is a vector of length W.

The read interface parameters $\Theta^r$ include a number of parameters that are used to read from the memory. Each reading r from memory can be vector of length W or a collection of R vectors of length W. The agent device can choose to take a single reading from the memory or multiple readings, as specified in the read interface parameters of the agent device.

An example of read interface parameters includes a read lookup key and a read key strength. The read lookup key is a vector or a number of vectors of length W. The read lookup key is a vector when the agent device wants a single reading from the memory. The read lookup key is a matrix of R rows with length W, in the case of R readings from the memory. The read key strength is a scalar for the case of a single read lookup key, and a vector of size R for the case of R readings from memory.

The write interface parameters $\Theta^w$ include a number of parameters that are used to write into the memory. The write interface parameters of all agent devices have the same dimensionality, since the write interface parameters from the different agent devices are aggregated by the central device. The writings in the memory contributed by the agent devices are in the form of vectors. At any point in time, a single vector of length W is written to the memory.

An example of write interface parameters of an agent device includes a write lookup key (a vector of length W), a write key strength (a scalar) and/or an erase vector (a vector of length W).

The overview procedure will now be described with reference to FIG. 2.

The controller neural nets 10*a-b* are located in the respective agent devices 2*a-b*. Each agent device 2*a-b* has its own controller neural net 10*a-b*, and all agent devices 2*a-b* share the same architecture for the controller neural nets 10*a-b*. They may be initialized similarly.

The predictive models 11*a-b* are also located in the agent devices 2*a-b*. Each devices 2*a-b* has its own predictive model 11*a-b*. The different agent devices 2*a-b* do not need to share the same architecture for their predictive models 11*a-b*. The predictive model can be a neural net or any other differentiable model, such as random forest, decision tree, linear models, etc. The agent devices 2*a-b* do not need to reveal the architecture of their predictive model to the central device or other agent devices 2*a-b*.

By separating the controller neural net and the predictive model, the agent devices can contribute to and benefit from the collective learning in the controller neural nets 10*a-b* without the need to disclose the architecture of their predictive model. The agent devices do not need to share any of its predictive model parameters with any other agent devices or the central device. Only the parameters for the controller neural net are shared with the central device. This makes the agent devices robust to attacks such as deep leakage if combined with secure aggregation. Moreover, the predictive models can be used to contain private information that is not meant to be shared with the central device or other agent devices in the federation.

The central device 3 controls and maintains the shared memory 22, which can e.g. be in the form of a memory matrix. The memory matrix is learned using data from all agent devices 2*a-b*. In other words, the shared memory 22 is a manifestation of the collaborative learning from the agent devices 2*a-b*. The memory matrix contains a number of rows, also known as memory locations. Each row (memory location) is a location vector of a certain size. The size of the location vector depends on the size of the output layer of the controller neural net. The mentioned structure can be transposed between rows and columns and still support embodiments presented herein.

The aggregator 20 takes the write interface parameters sent from the controller neural nets 10*a-b* of the agent devices 2a-b. The aggregator 20 produces an aggregated (e.g. averaged quantity either by taking simple averaging or weighted averaging) set of write interface parameters. When the averaging is weighted, Simply, the weights can e.g. be a function of the number of data points that an agent device has. Alternatively, the weights can be computed by comparing similarities between the interface parameters of the agent devices. An agent device whose write interface parameters are very different from other agent devices can be assigned, accordingly, higher or lower weights than the other agent devices whose write interface parameters are similar. Other procedures for calculating the weights could also be applied.

Hence, the agent devices 2a-b do not have the right to directly write in the shared memory 22. Only the central device 3 can write in the shared memory 22 using its write head 21, which, in turn, is based on aggregation of the write interface parameters. The write head 21 receives the aggregated write interface parameters from the aggregator 20, and writes to the shared memory 22, resulting in an updated version of the shared memory 22. There are no explicit constraints on the size of the shared memory 22; in practice, it can be arbitrarily large.

There is a read head 23a-b for each agent device 21a-b. Each read head is only accessible for its associated agent device 2a-b. In this way, the central device 3 sends personalized readings of the shared memory 22 to the agent devices 2a-b using their respective read heads 23a-b. A read head 23a-b of a given agent device 2a-b takes as its input the updated shared memory 22 and the read interface parameters of the agent device in question 2a-b. This results in a reading from the shared memory 22 that is personalized for each agent device 2a-b.

Figure 3A:
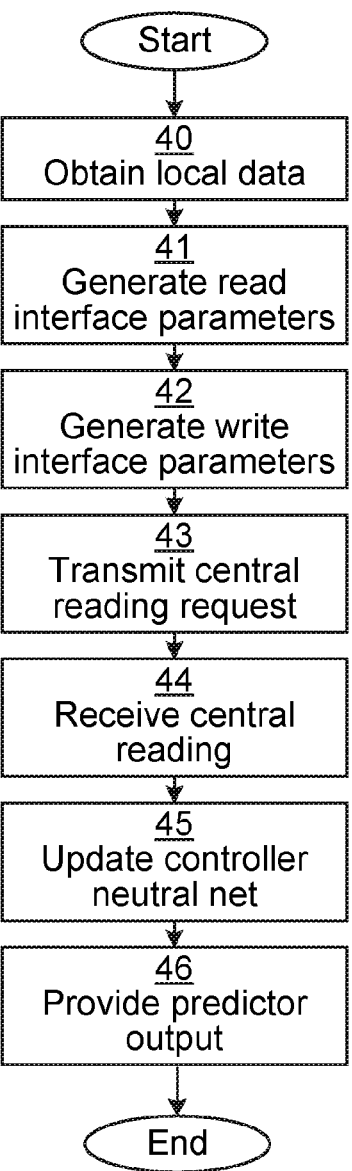
FIGS. 3A-B are flow charts illustrating embodiments of methods performed by the agent device for enabling collaborative machine learning, a result of which is stored in a shared memory controlled by a central device.
Figure 3B:
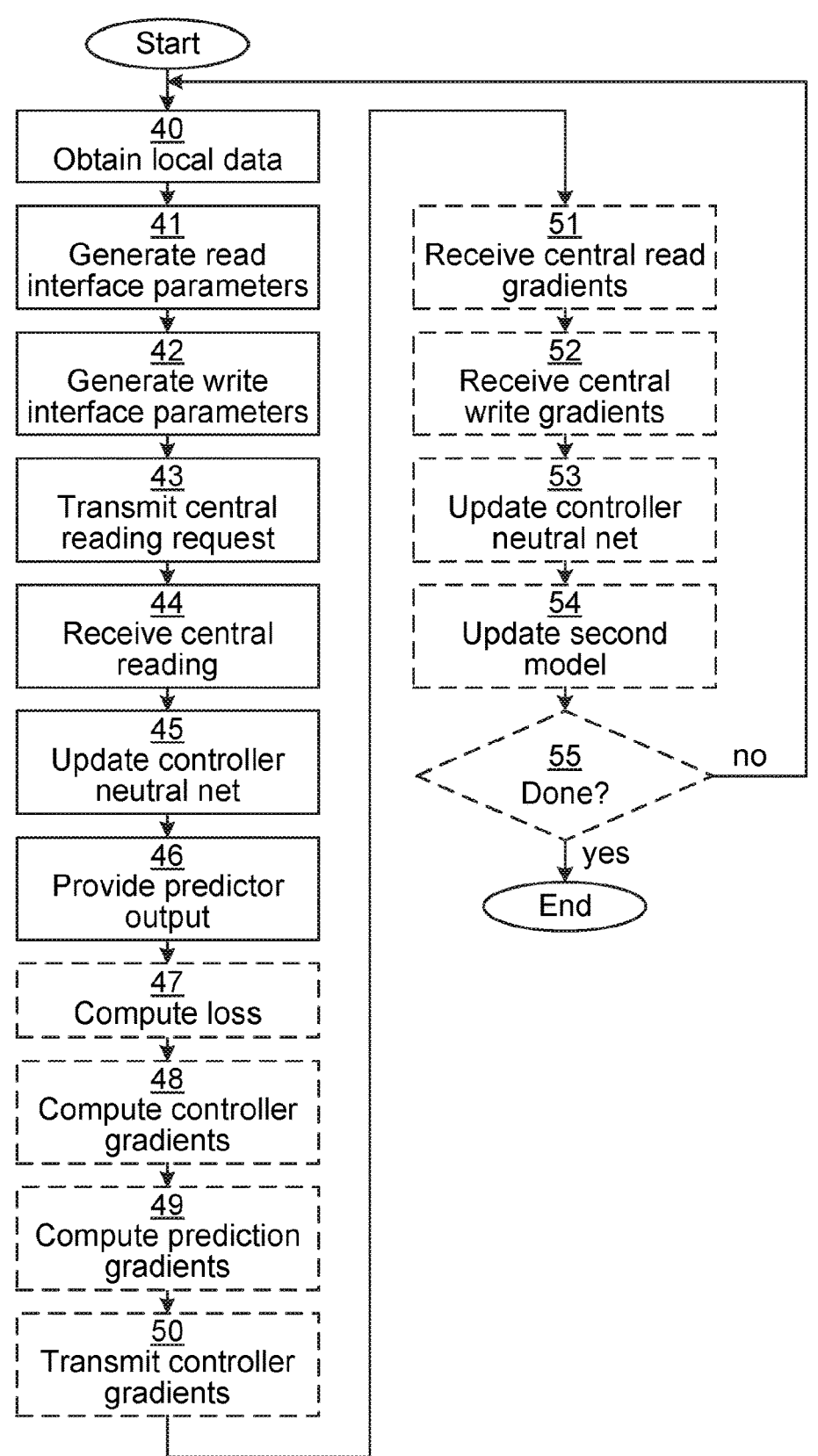

FIGS. 3A-B are flow charts illustrating embodiments of methods performed by the agent device for enabling collaborative machine learning, a result of which is stored in a shared memory controlled by a central device. Furthermore, these embodiments enable performing inference by a plurality of agent devices 2, 2a-b comprising respective machine learning models configured for inference based on the shared memory.

Before the method starts, the central device and the agent devices are initialised. Specifically, the central device initializes the memory matrix and sends the initial readings from the memory to the agent devices.

In an obtain local data step 40, the agent device obtains local input data.

In a generate read interface parameters step 41, the agent device generates read interface parameters based on the local input data using a controller neural net 10a-b being a first model. The read interface parameters are also based on previous readings from the shared memory.

In a generate write interface parameters step 42, the agent device generates write interface parameters based on the local input data using the controller neural net 10a-b. The write interface parameters are also based on previous readings from the shared memory.

In a transmit central reading request step 43, the agent device transmits a central reading request to the central device 3. The central reading request comprises the read interface parameters and the write interface parameters. The central reading request requests the central device 3 to update a memory matrix based on the write interface parameters and to read the memory matrix based on the read interface parameters.

In a receive central reading step 44, the agent device receives a central reading from the central device 3.

In an update controller neutral net step 45, the agent device updates the controller neural net 10a-b of the agent device based on the central reading.

In a provide predictor output step 46, the agent device provides a predictor output of local input data based on the controller neural net and a second model 11a-b of the agent device 2, 2a-b. The second model 11a-b has as an input an output of the controller neural net 10a-b. The predictor output is thus obtained from the second model 11a-b.

Looking now to FIG. 3B, only new or modified steps will be described.

In an optional compute loss step 47, the agent device computes a loss by comparing an estimation of the predictor output with an actual outcome. The agent devices use the current readings from the shared memory and the output from the controller neural net to produce an estimation of the predictor output. Each agent device then computes the loss between the true predictor output (e.g., labels) and the estimated predictor output, as $\ell = \text{loss}(y, \hat{y})$, where y is the true predictor output and $\hat{y}$ is the estimated predictor output. The function loss( ) is any suitable loss function that indicates discrepancies between y and $\hat{y}$.

In an optional compute controller gradients step 48, the agent device computes a set of controller gradients of the loss with respect to the read interface parameters and the write interface parameters, respectively.

In an optional compute prediction gradients step 49, the agent device computes a set of prediction gradients of the loss with respect to the predictor output.

In an optional transmit controller gradients step 50, the agent device transmits the set of controller gradients to the central device 3.

In an optional receive central read gradients step 51, the agent device receives from the central device 3 a set of central read gradients of the read interface parameters with respect to a read head 23a-b in the central device 3 for the agent device 2, 2a-b.

In an optional receive central write gradients step 52, the agent device receives from the central device 3 a set of central write gradients of the write interface parameters with respect to a read head 23a-b in the central device 3 for the agent device 2, 2a-b.

In an optional update controller neutral net step 53, the agent device updates neural net parameters for the controller neural net 10a-b based on the received central read gradients and the received central write gradients.

In an optional update second model step 54, the agent device updates parameters for the second model 11a-b based on the received central read gradients and the received central write gradients.

In an optional conditional done step 55, the agent device repeats the method determines when a stopping criterion is true. In one embodiment, the stopping criterion is true when a variation metric of average loss for the agent device and other agent devices is less than a threshold. In one embodiment, the stopping criterion is true after a threshold number of iterations of the method. Then at least one stopping criterion is true, the method ends. Otherwise, the method returns to the obtain local data step 40.

Figures 4A, 4B:
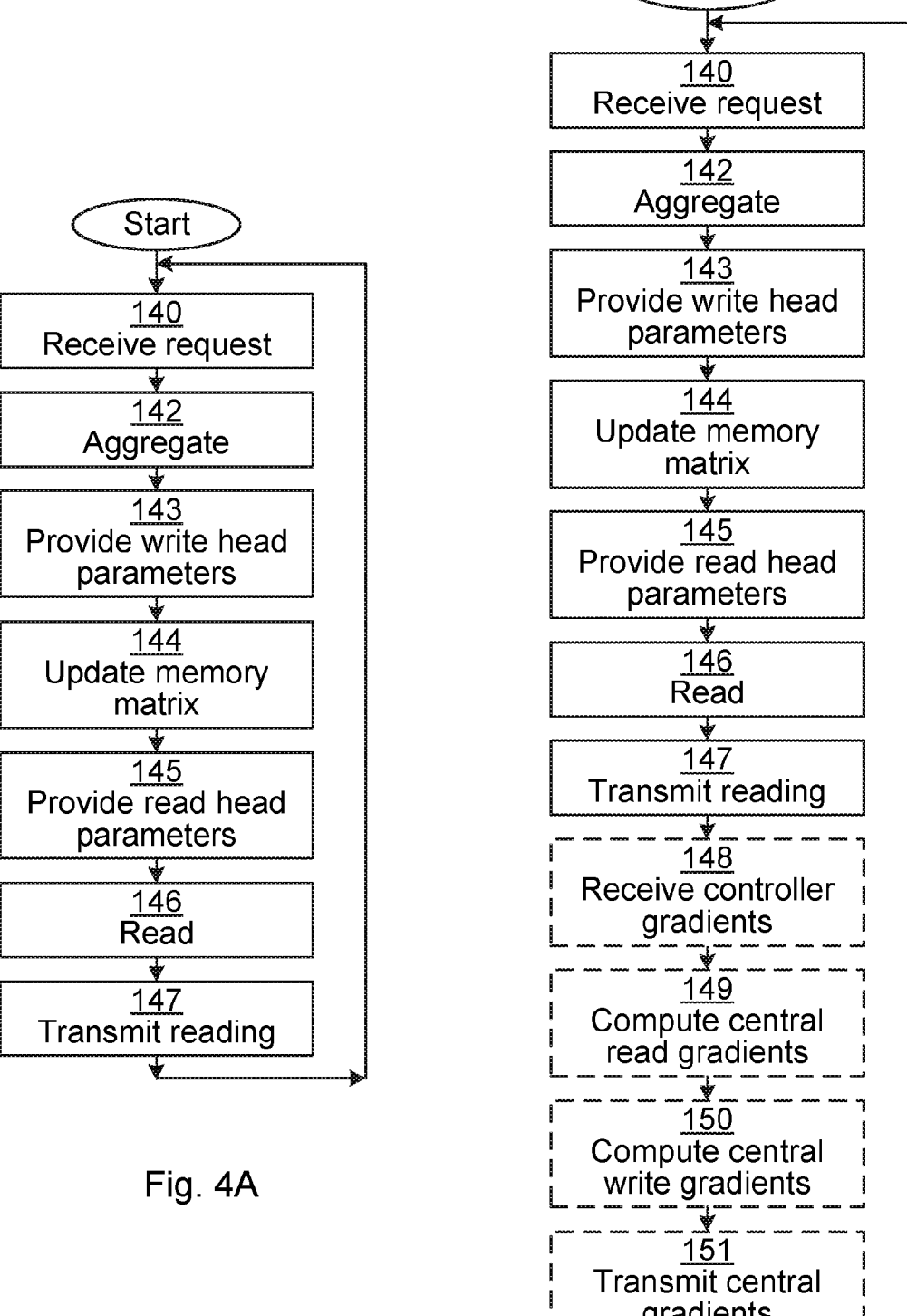
FIGS. 4A-B are flow charts illustrating embodiments of methods performed by the central device for enabling collaborative machine learning, a result of which is stored in a shared memory controlled by a central device.

FIGS. 4A-B are flow charts illustrating embodiments of methods performed by the central device for enabling collaborative machine learning, a result of which is stored in a shared memory controlled by a central device. Furthermore, these embodiments enable performing inference by a plurality of agent devices 2, 2a-b comprising respective machine learning models configured for inference based on the shared memory.

In a receive request step 140, the central device receives a plurality of central reading requests from respective agent devices 2, 2a-b. The central reading request comprises read interface parameters and write interface parameters.

In an aggregate step 142, the central device aggregates the write interface parameters of the plurality of central reading requests. The aggregation can e.g. be performed by calculating an average of the write interface parameters from the agent devices. The averaging can be a simple average or a weighted average.

In a provide write head parameters step 143, the central device provides parameters for a write head 21 based on the aggregated write interface parameters. The parameters for the write head 21 can be provided based on the aggregated write interface parameters and optionally a current state of the memory matrix 22.

In an update memory matrix step 144, the central device updates a memory matrix 22 of the shared memory based on the write head 21.

In a provide read head parameters step 145, the central device provides, for each agent device 2, 2a-b, parameters for a read head 23a-b based on the respective read interface parameters. The parameters for the read head 23a-b can be provided based on the respective read interface parameters and optionally a current state of the memory matrix 22.

In a read step 146, the central device reads, for each agent device, a central data reading being a selection of data from the memory matrix in the shared memory based on the respective read head 23a-b.

In a transmit reading step 147, the central device transmits the central data readings, respectively, to each one of the agent devices 2, 2a-b.

Looking now to FIG. 4B, only new or modified steps will be described.

In an optional receive controller gradients step 148, the central device receives respective sets of controller gradients from each one of the plurality of agent devices 2, 2a-b.

In an optional compute central read gradients step 149, the central device computes, for each one of the plurality of agent devices 2, 2a-b, a set of central read gradients of the read interface parameters with respect to parameters for the read head 23a-b for the agent device 2, 2a-b.

In an optional compute central write gradients step 150, the central device computes, for each one of the plurality of agent devices 2, 2a-b, a set of central write gradients of the write interface parameters for the agent device 2, 2a-b with respect to parameters for the write head 21.

In an optional transmit central gradients step 151, the central device transmits respective sets of central read gradients and central write gradients to each one of the plurality of agent devices 2, 2a-b.

Figure 5:
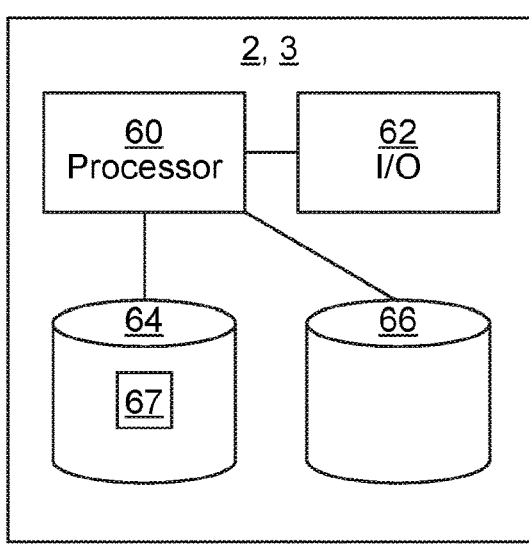
FIG. 5 is a schematic diagram illustrating components of the agent devices and the central device of FIG. 1 according to one embodiment.

FIG. 5 is a schematic diagram illustrating components of each one of the agent devices 2a-b (represented by a single agent device 2) and the central device 3 of FIG. 1 according to one embodiment. It is to be noted that when implemented in a host device, one or more of the mentioned components can be shared with the host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described above with reference to FIGS. 3A-B for the agent device and FIGS. 4A-B for the central device.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

An I/O interface 62 is provided for communicating with external and/or internal entities. Optionally, the I/O interface 62 also includes a user interface.

Other components are omitted in order not to obscure the concepts presented herein.

Figure 6:
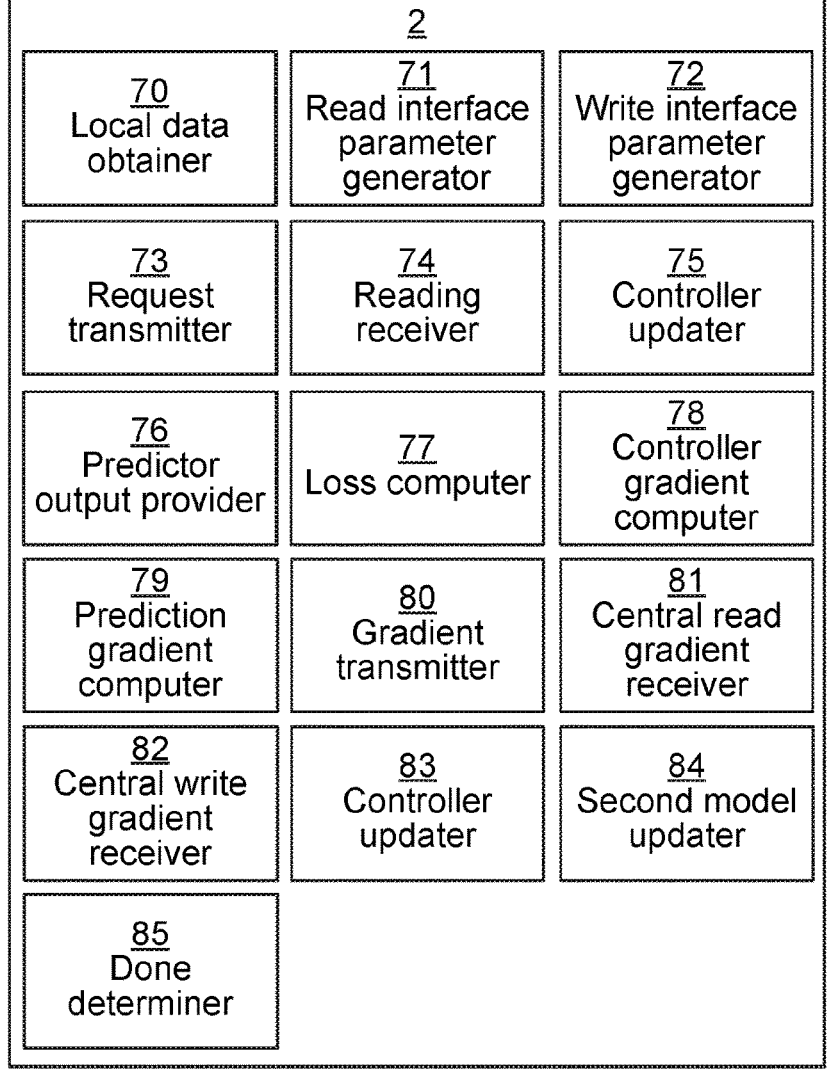
FIG. 6 is a schematic diagram showing functional modules of the agent device of FIG. 1 according to one embodiment.

FIG. 6 is a schematic diagram showing functional modules of the agent device 2 of FIG. 1 according to one embodiment. The modules are implemented using software instructions such as a computer program executing in the agent device 2. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A and 3B.

A local data obtainer 70 corresponds to step 40. A read interface parameter generator 71 corresponds to step 41. A write interface parameter generator 72 corresponds to step 42. A request transmitter 73 corresponds to step 43. A reading receiver 74 corresponds to step 44. A controller updater 75 corresponds to step 45. A predictor output provider 76 corresponds to step 46. A loss computer 77 corresponds to step 47. A controller gradient computer 78 corresponds to step 48. A prediction gradient computer 79 corresponds to step 49. A gradient transmitter 80 corresponds to step 50. A central read gradient receiver 81 corresponds to step 51. A central write gradient receiver 82 corresponds to step 52. A controller updater 83 corresponds to step 53. A second model updater 84 corresponds to step 54. A done determiner 85 corresponds to step 55.

FIG. 7 is a schematic diagram showing functional modules of the central device of FIG. 1 according to one embodiment. The modules are implemented using software instructions such as a computer program executing in the central device 3. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A and 4B.

A request receiver 170 corresponds to step 140. An aggregator 172 corresponds to step 142. A write head parameter provider 173 corresponds to step 143. A memory matrix updater 174 corresponds to step 144. A read head parameter provider 175 corresponds to step 145. A reader 176 corresponds to step 146. A readings transmitter 177 corresponds to step 147. A gradient receiver 178 corresponds to step 148. A central read gradient computer 179 corresponds to step 149. A central write gradient computer 180 corresponds to step 150. A central gradient transmitter 181 corresponds to step 151.

FIG. 8 shows one example of a computer program product 90 comprising computer readable means 91. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 5. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system for enabling collaborative machine learning, a result of which is stored in a shared memory controlled by a central device and enabling performing inference by a plurality of agent devices comprising respective machine learning models configured for inference based on the shared memory, the system comprising the plurality of agent devices and the central device, wherein each one of the agent devices comprises:

a processor; and a memory storing instructions that, when executed by the processor, cause the agent device to:

obtain local input data;

generate read interface parameters based on the local input data using a controller neural net being a first model;

generate write interface parameters based on the local input data using the controller neural net;

transmit a central reading request to the central device, the central reading request comprising the read interface parameters and the write interface parameters, the central reading request requesting the central device to update a memory matrix based on the write interface parameters and to read the memory matrix based on the read interface parameters;

receive a central reading from the central device;

update the controller neural net of the agent device based on the central reading; and provide a predictor output of local input data based on the controller neural net and a second model of the agent device, the second model having as an input an output of the controller neural net, wherein the predictor output is obtained from the second model;

and wherein the central device comprises:

a processor; and a memory storing instructions that, when executed by the processor, cause the central device to:

receive a plurality of the central reading requests from the agent devices;

aggregate the write interface parameters of the plurality of central reading requests;

provide parameters for a write head based on the aggregated write interface parameters;

update the memory matrix based on the write head;

provide, for each agent device, parameters for a read head based on the respective read interface parameters;

read, for each agent device, a central data reading being a selection of data from the memory matrix based on the respective read head; and transmit the central data readings, respectively, to each one of the agent devices.

2. A method for enabling collaborative machine learning, a result of which is stored in a shared memory controlled by a central device and enabling performing inference by a plurality of agent devices comprising respective machine learning models configured for inference based on the shared memory, the method being performed by one of the agent devices, the method comprising:

obtaining local input data;

generating read interface parameters based on the local input data using a controller neural net being a first model;

generating write interface parameters based on the local input data using the controller neural net;

transmitting a central reading request to the central device, the central reading request comprising the read interface parameters and the write interface parameters, the central reading request requesting the central device to update a memory matrix based on the write interface parameters and to read the memory matrix based on the read interface parameters;

receiving a central reading from the central device;

updating the controller neural net of the agent device based on the central reading; and providing a predictor output of local input data based on the controller neural net and a second model of the agent device, the second model having as an input an output of the controller neural net, wherein the predictor output is obtained from the second model.

3. The method according to claim 2, further comprising the step of:

computing a loss by comparing an estimation of the predictor output with an actual outcome;

computing a set of controller gradients of the loss with respect to the read interface parameters and the write interface parameters, respectively;

computing a set of prediction gradients of the loss with respect to the predictor output;

transmitting the set of controller gradients to the central device;

receiving from the central device a set of central read gradients of the read interface parameters with respect to a read head in the central device for the agent device;

receiving from the central device a set of central write gradients of the write interface parameters with respect to a read head in the central device for the agent device;

updating neural net parameters for the controller neural net based on the received central read gradients and the received central write gradients; and updating parameters for the second model based on the received central read gradients and the received central write gradients.

4. The method according to claim 3, further comprising:

repeating the method until a stopping criterion is true.

5. The method according to claim 4, wherein the stopping criterion is true when a variation metric of average loss for the agent device and other agent devices is less than a threshold.

6. The method according to claim 4, wherein the stopping criterion is true after a threshold number of iterations of the method.

7. An agent device for enabling collaborative machine learning, a result of which is stored in a shared memory controlled by a central device and enabling performing inference by a plurality of agent devices comprising respective machine learning models configured for inference based on the shared memory, the agent device comprising:

a processor; and a memory storing instructions that, when executed by the processor, cause the agent device to:

obtain local input data;

generate read interface parameters based on the local input data using a controller neural net being a first model;

generate write interface parameters based on the local input data using the controller neural net;

transmit a central reading request to the central device, the central reading request comprising the read interface parameters and the write interface parameters, the central reading request requesting the central device to update a memory matrix based on the write interface parameters and to read the memory matrix based on the read interface parameters;

receive a central reading from the central device;

update the controller neural net of the agent device based on the central reading; and provide a predictor output of local input data based on the controller neural net and a second model of the agent device, the second model having as an input an output of the controller neural net, wherein the predictor output is obtained from the second model.

8. The agent device according to claim 7, further comprising instructions that, when executed by the processor, cause the agent device to:

compute a loss by comparing an estimation of the predictor output with an actual outcome;

compute a set of controller gradients of the loss with respect to the read interface parameters and the write interface parameters, respectively;

compute a set of prediction gradients of the loss with respect to the predictor output;

transmit the set of controller gradients to the central device;

receive from the central device a set of central read gradients of the read interface parameters with respect to a read head in the central device for the agent device;

receive from the central device a set of central write gradients of the write interface parameters with respect to a read head in the central device for the agent device;

update neural net parameters for the controller neural net based on the received central read gradients and the received central write gradients; and update parameters for the second model based on the received central read gradients and the received central write gradients.

9. The agent device according to claim 8, further comprising instructions that, when executed by the processor, cause the agent device to:

repeat said instructions until a stopping criterion is true.

10. The agent device according to claim 9, wherein the stopping criterion is true when a variation metric of average loss for the agent device and other agent devices is less than a threshold.

11. The agent device according to claim 9, wherein the stopping criterion is true after a threshold number of iterations.

12. A method for enabling collaborative machine learning, a result of which is stored in a shared memory controlled by a central device and enabling performing inference by a plurality of agent devices comprising respective machine learning models configured for inference based on the shared memory, the method being performed by the central device, the method comprising:

receiving a plurality of central reading requests from respective agent devices, the central reading request comprising read interface parameters and write interface parameters;

aggregating the write interface parameters of the plurality of central reading requests;

providing parameters for a write head based on the aggregated write interface parameters;

updating a memory matrix based on the write head;

providing, for each agent device, parameters for a read head based on the respective read interface parameters;

reading, for each agent device, a central data reading being a selection of data from the memory matrix based on the respective read head; and transmitting the central data readings, respectively, to each one of the agent devices.

13. The method according to claim 12, wherein the providing parameters for a write head comprises providing parameters for the write head based on the aggregated write interface parameters and a current state of the memory matrix.

14. The method according to claim 12, wherein the providing parameters for a read head comprises providing parameters for the read head based on the respective read interface parameters and a current state of the memory matrix.

15. The method according to claim 12, wherein the aggregating comprises aggregating the write interface parameters of the plurality of central reading requests by calculating an average of the write interface parameters.

16. The method according to claim 12, further comprising:

receiving respective sets of controller gradients from each one of the plurality of agent devices;

computing, for each one of the plurality of agent devices, a set of central read gradients of the read interface parameters with respect to parameters for the read head for the agent device;

computing, for each one of the plurality of agent devices, a set of central write gradients of the write interface parameters for the agent device with respect to parameters for the write head; and transmitting respective sets of central read gradients and central write gradients to each one of the plurality of agent devices.

* * * * *